United States Patent [19]
Bullard et al.

[11] Patent Number: 4,811,959
[45] Date of Patent: Mar. 14, 1989

[54] SEAL ASSEMBLY FOR WELL LOCKING MANDREL

[75] Inventors: Roy P. Bullard, Grand Prairie; Russell I. Bayh, III, Carrollton, both of Tex.

[73] Assignee: Otis Engineering Corporation, Dallas, Tex.

[21] Appl. No.: 126,039

[22] Filed: Nov. 27, 1987

[51] Int. Cl.⁴ .............................................. F16J 15/20
[52] U.S. Cl. ................................... 277/124; 277/125; 277/129; 277/205; 277/229; 277/DIG. 6
[58] Field of Search ............... 277/229, 230, 123, 124, 277/125, 117, 110; 166/387, 134

[56] References Cited

U.S. PATENT DOCUMENTS

| | | | |
|---|---|---|---|
| 2,322,679 | 6/1943 | Williamson | 277/124 X |
| 2,656,229 | 10/1953 | Stillwagon . | |
| 2,698,056 | 12/1954 | Marshall et al. | 166/123 |
| 2,761,203 | 9/1956 | De Witt . | |
| 3,033,722 | 5/1962 | Goodloe . | |
| 3,171,661 | 3/1965 | Blair et al. | 277/124 X |
| 3,208,531 | 9/1965 | Tamplen | 166/125 |
| 3,404,061 | 10/1968 | Shane et al. . | |
| 3,719,366 | 3/1973 | Pippert | 277/205 |
| 4,214,761 | 7/1980 | Pippert | 277/123 |
| 4,219,204 | 8/1980 | Pippert | 277/188 A |
| 4,254,829 | 3/1981 | Watkins | 166/134 |
| 4,281,840 | 8/1981 | Harris | 277/124 X |
| 4,296,806 | 10/1981 | Taylor et al. | 166/120 |
| 4,326,588 | 4/1982 | McStravick | 277/125 X |
| 4,396,061 | 8/1983 | Tamplen et al. | 166/217 |
| 4,524,982 | 6/1985 | Hertz | 277/229 |
| 4,548,265 | 10/1985 | Luke | 277/123 X |
| 4,705,722 | 11/1987 | Veda et al. | 277/230 |

FOREIGN PATENT DOCUMENTS

| | | | |
|---|---|---|---|
| 17337 | 2/1908 | Norway | 277/124 |
| 722462 | 1/1955 | United Kingdom | 277/125 |

*Primary Examiner*—Allan N. Shoap
*Attorney, Agent, or Firm*—Thomas R. Felger

[57] ABSTRACT

A seal assembly for use on a downhole well tool such as a wireline locking mandrel. The seal assembly includes a center element, multiple v-rings, wire mesh backup rings, and minimum clearance metal backup rings. The v-rings are manufactured from asbestos yarn impregnated with an elastomer and wrapped with tetrafluorethylene-propylene copolymer or terpolymer.

8 Claims, 3 Drawing Sheets

SEAL ASSEMBLY FOR WELL LOCKING MANDREL

BACKGROUND OF THE INVENTION

This invention relates to fluid seals used in the oil and gas industry and particularly to locking mandrels used to releasably anchor well tools at downhole locations in a well bore.

DESCRIPTION OF THE RELATED ART

It is common practice to use locking mandrels to releasably anchor well tools at a downhole location in a well flow conductor. Examples of such locking mandrels are shown in U.S. Pat. Nos. 2,698,056 to S. J. E. Marshall et al; 3,208,531 to Jack W. Tamplen; and 4,396,061 to Jack W. Tamplen et al. It is also common practice to place a seal assembly on the exterior of a locking mandrel to form a fluid barrier with the well flow conductor adjacent thereto. As shown in U.S. Pat. No. 2,698,056, such seal assemblies typically have multiple Chevron type packing rings and metal backup rings. Patent '056 further teaches that the packing rings may be made of fabric impregnated with rubber, asbestos with a plastic binder, or other suitable composition. U.S. Pat. No. 4,524,982 to Daniel L. Hertz, Jr. discloses a packing ring manufactured from asbestos yarn impregnated with elastomeric material and wrapped with tetrafluorethylene-propylene copolymer or terpolymer (sometimes referred to as AFLAS). U.S. Pat. No. 4,296,806 to Donald F. Taylor et al teaches the use of various materials such as Graphoil, a registered trademark of Union Carbide Corporation, wire mesh, asbestos cord and ceramic fibers for elements in well packing arrays. U.S. Pat. No. 3,404,061 teaches the manufacture of Graphoil. U.S. Pat. No. 4,296,806 is directed towards packing arrays for production well packers which are typically used to establish a fluid barrier between the exterior of a tubing string and the interior of a casing string.

U.S. Pat. Nos. 2,761,203 to W. M. De Witt, Sr. and 3,033,722 to A. M. Goodloe teach the manufacture of wire mesh gaskets or rings. U.S. Pat. Nos. 2,656,229 to C. K. Stillwagon; 3,719,366 to Aaron J. Pippert; and 4,219,204 to Fredrick B. Pippert teach the use of wire mesh or knitted metallic filaments to serve as an antiextrusion section in elastomeric, polymeric and thermoplastic packing materials.

The above listed patents are incorporated by reference for all purposes in this application.

SUMMARY OF THE INVENTION

The present invention provides a seal assembly which can be used on retrievable well tools such as wireline locking mandrels to establish a fluid barrier at elevated temperatures and pressures. Typical operating environments for the present invention are 0 to 12,500 psi. and temperatures to 650° F. Previous seal assemblies are subject to serious deformation (carborizing and/or melting) at these elevated temperatures and pressures.

An alternative embodiment of the present invention also provides a superior sliding fluid barrier in the same operating environment.

Additional objects and advantages of the present invention will be apparent to those skilled in the art from studying the following detailed description in conjunction with the accompanying drawings and claims.

DESCRIPTION OF THE PREFERRED EMBODIMENTS

Figure 1:
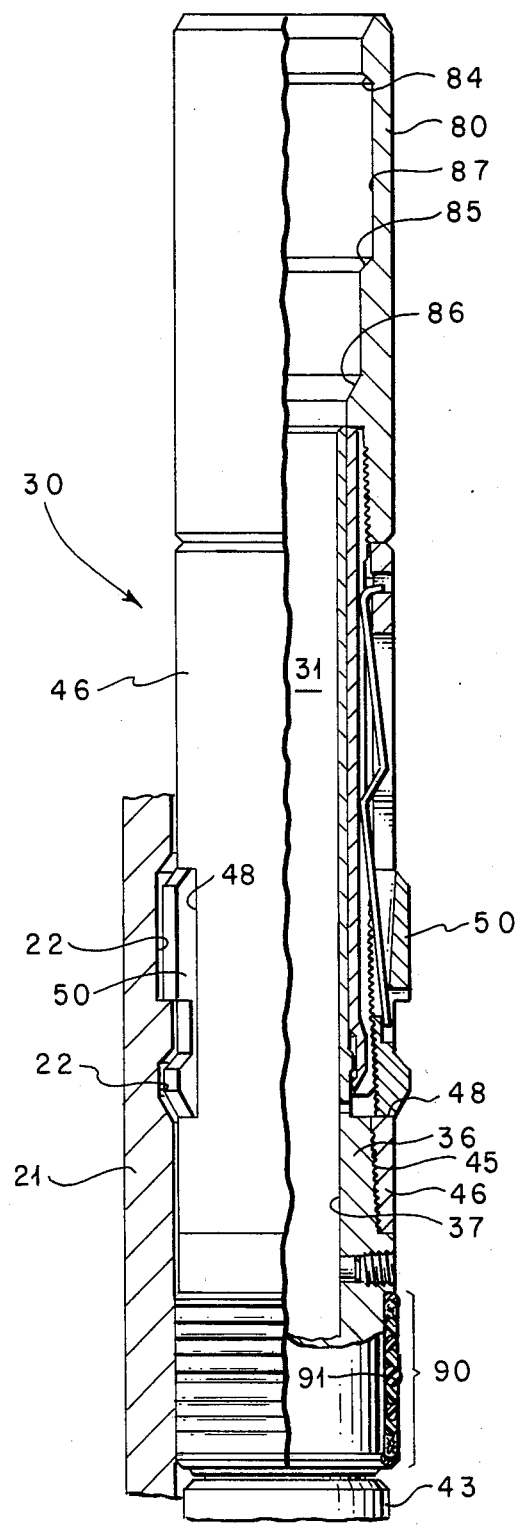
FIG. 1 is a drawing, partially in section and partially in elevation with portions broken away, showing a locking mandrel with a seal assembly embodying the present invention.

Locking mandrel 30, as shown in FIG. 1, is a generally long, hollow, cylindrical well tool with longitudinal flow passageway 31 extending therethrough. The various components which comprise locking mandrel 30 are attached to or carried by tubular body 36. Inside diameter (bore) 37 of tubular body 36 defines a portion of longitudinal flow passageway 31. Well tool 43 is attached to the lower portion of tubular body 36 by a threaded connection (not shown). Well tool 43 may be a subsurface safety valve, flow choke, plug, or other downhole flow control device.

Key retainer sleeve 46 is engaged to tublar body 36 by threads 45. Keys 50 are disposed in windows 48 of sleeve 46. Keys 50 may be expanded or contracted to engage or disengage locking mandrel 30 from landing nipple 21. Grooves 22 are machined on the inside diameter of landing nipple 21 to match a similar profile on the exterior of keys 50. Grooves 22 and keys 50 cooperate to releasably anchor locking mandrel 30 at the desired downhole location. Tubular fishing neck 80 with shoulders 84, 85, and 86 and annular recess 87 function as a handling tool for setting and releasing locking mandrel 30.

U.S. Pat. Nos. 3,208,531 and 4,396,061 provide additional details concerning the design and operation of downhole locking mandrels and running tools (not shown). Landing nipple 21 is typically a separate downhole tool which is attached to a joint of tubing (not shown) during completion of the well. Grooves 22 are sometimes provided on the inside diameter of downhole equipment such as tubing retrievable safety valves (not shown) and well packers (not shown).

Figure 2:
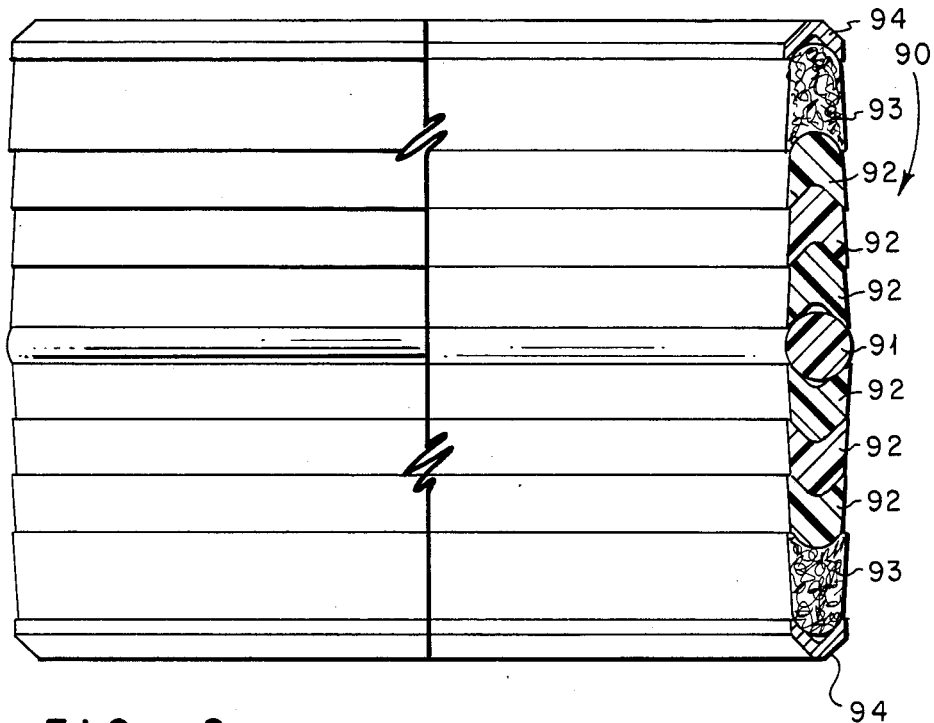
FIG. 2 is an enlarged drawing, partially in section and partially in elevation with portions broken away, showing the seal assembly of FIG. 1.

Seal assembly 90 is carried on the exterior of tubular body 36 to form a fluid barrier with the interior of landing nipple 21 adjacent thereto. As best shown in FIG. 2, seal assembly 90 includes a plurality of V-shaped or Chevron-type packing rings 92. Center element 91 of seal assembly 90 is preferably an o-ring with a circular cross section. Element 91 is manufactured from asbestos yarn impregnated with elastomeric material and wrapped with tetrafluorethylene-propylene copolymer or terpolymer (sometimes referred to as AFLAS). The combination of asbestos yarn and AFLAS are important components in seal assembly 90. They enhance the high temperature, high pressure operating characteristics of seal assembly 90.

V-rings 92 are stacked on opposite sides of center element 91. V-rings 92 are manufactured from asbestos yarn impregnated with elastomeric material and wrapped with AFLAS. One wire mesh ring 93 is next stacked adjacent to each outer v-ring 92. Wire mesh rings 93 provide support for v-rings 92. Rings 93 can expand radially to provide 100% backup between the outside diameter of tubular body 36 and the adjacent inside diameter of landing nipple 21. Wire mesh rings 93 will also deform to fill in any irregularities on the interior of landing nipple 21. Minimum clearance rings 94 are the final element on each end of seal assembly 90. Minimum clearance rings 94 are manufactured from metal which is compatible with locking mandrel 30 and landing nipple 21. At very high pressures, minimum clearance rings 94 will flex radially outwards to close the gap between tubular body 36 and landing nipple 21.

Wire mesh ring 93 has several characteristics which greatly improve the operation performance of seal assembly 90. Wire mesh ring 93 can be readily compressed to block any extrusion gap between landing nipple 21 and locking mandrel 30. Wire mesh ring 93 will fill in any scratches, marks or similar defects on the interior of landing nipple 21 and will more uniformly distribute sealing forces over a larger area of landing nipple 21 and tubular body 36 adjacent thereto. Wire mesh ring 93 can compensate for ovality (non-circular cross section) of landing nipple 21 and centralize seal assembly 90 therein. The porous nature of wire mesh ring 93 provides a structure to trap swarf, tramp metal, or similar debris which may be found on the inside diameter of landing nipple 21. Wire mesh ring 93 is self-feeding under compression to compensate for corrosion and wear loss.

Alternative Embodiments

Figure 3:
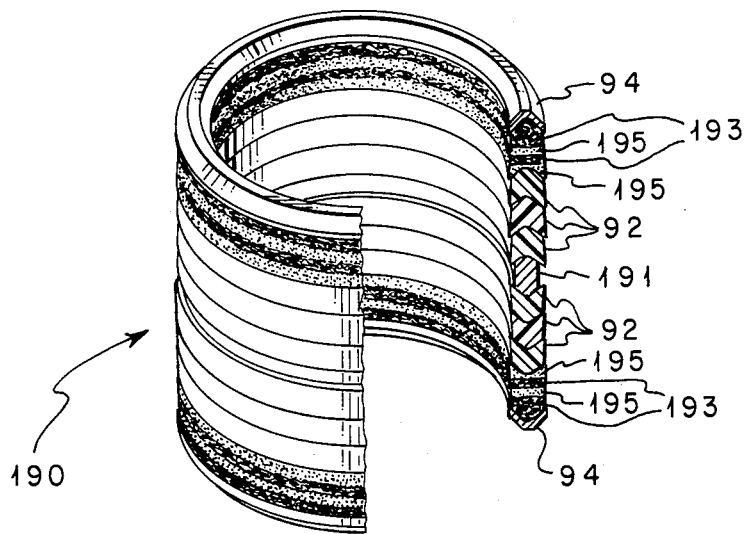
FIG. 3 is an isometric view, with portions broken away, of a seal assembly incorporating an alternative embodiment of the present invention.

An alternative embodiment, seal assembly 190, is shown in FIG. 3. Minimum clearance rings 94 and v-rings 92 are used in both seal assemblies 90 and 190. O-ring 91 of seal assembly 90 provides a good fluid barrier at low pressures but may produce undesired friction or drag forces at higher pressures. If drag forces are of concern, o-ring 91 can be replaced by center element 191. In seal assembly 190, o-ring 91 has been replaced by center element 191. Center element 191 is manufactured from the same metal as selected for minimum clearance rings 94. Also, center element 191 has a cross section to fit within adjacent v-rings 92. Center element 191 may sometimes be referred to as a double male adapter. Wire mesh rings 93 have been replaced with alternating layers of flexible graphite (Graphoil) rings 195 and wire mesh 193.

Figure 4:
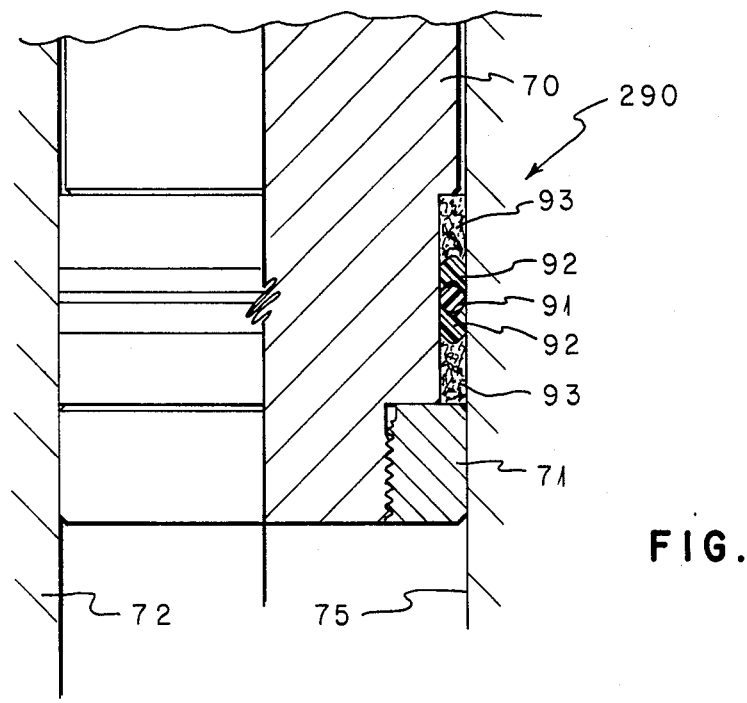
FIG. 4 is a schematic drawing, partially in section and partially in elevation with portions broken away, showing a sliding seal assembly embodying the present invention.
Figure 5:
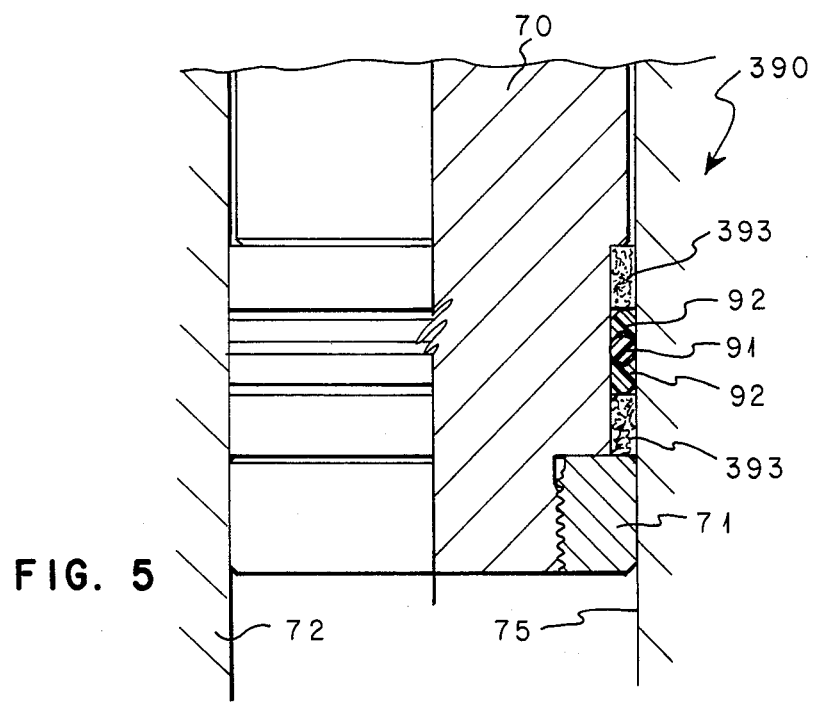
FIG. 5 is a schematic drawing, partially in section and partially in elevation with portions broken away, showing a sliding seal assembly embodying the present invention.

The present invention may be readily adapted for use with a sliding seal assembly by removing minimum clearance rings 94 as shown in FIGS. 4 and 5. Sliding seal assemblies 290 and 390 have many possible uses in a downhole well environment such as piston means for hydraulically actuated safety valves, downhole reciprocating pumps, travel joints, sliding sleeve valves, and well packer seal units. In addition to the previously discussed advantages, wire mesh ring 93 improves the finish of honed bore 75 during reciprocating movement of seal assemblies 290 and 390.

In FIG. 4, seal assembly 290 is secured to movable rod 70 by nut 71. Rod 70, seal assembly 290, and nut 71 are slidably disposed within honed bore 75 of well tool 72. Well tool 72 may be a subsurface safety valve, well pump, sliding sleeve valve, or any similar downhole tool. Seal assembly 290 has five elements—center element or o-ring 91, v-rings 92 on opposite sides of center element 91, and a wire mesh ring 93 adjacent to each v-ring 92.

Wire mesh ring 93 performs the same functions as previously described for locking mandrel 30. In addition, the porous nature of wire mesh ring 93 provides a structure to retain lubricating fluids as rod 70 reciprocates longitudinally within honed bore 75. Uniform distribution of sealing forces by wire mesh ring 93 against honed bore 75 minimizes point loading which in turn greatly reduces the possibility of seal assembly 290 galling, seizing, or spalling honed bore 75.

Seal assembly 390 of FIG. 5 is the same as previously described seal assembly 290 except for the rectangular cross section of wire mesh ring 393. Previously discussed wire mesh rings 93 and 193 have a cross section similar to v-ring 92. This cross section does result in some added manufacturing costs. The previously noted characteristics of wire mesh rings cooperate to allow seal assembly 390 to function satisfactorily with wire mesh ring 393 initially having a rectangular cross section. Depending upon the specific environment and downhole operating time, wire mesh ring 393 will conform to rod 70, honed bore 75 and adjacent v-ring 92 to establish the desired fluid barrier. Depending upon the specific operating environment and the metal selected, seal assembly 390 may offer a substantial cost saving as compared to other seal assemblies having the same operating characteristics.

The previous description is illustrative of only some of the embodiments of the invention. Those skilled in the art will readily see other variations for seal assemblies on downhole well tools utilizing the present invention. Changes and modifications may be made without departing from the scope of the invention which is defined by the claims.

We claim:

1. A seal assembly for use on downhole well tools such as wireline locking mandrels comprising:
    a. a center element;
    b. a plurality of v-rings stacked on either side of the center element;
    c. the v-rings having asbestos yarn impregnated with an elastomer and wrapped with tetrafluorethylene-propylene copolymer;
    d. a wire mesh ring adjacent the last v-ring on each side of the center element;
    e. the center element comprising an o-ring having asbestos yarn impregnated with an elastomer and wrapped with tetrafluorethylene-propylene copolymer; and
    f. the wire mesh rings comprising alternating layers of wire mesh and flexible graphite.

2. A seal assembly as defined in claim 1 further comprising minimum clearance metal rings abutting each wire mesh ring.

3. A seal assembly as defined in claim 1 wherein the wire mesh ring initially has a substantially rectangular cross section.

4. A seal assembly for use on downhole well tools such as wireline locking mandrels comprising:
    a. a center element;
    b. a plurality of v-rings stacked on either side of the center element;

c. the v-rings having asbestos yarn impregnated with an elastomer and wrapped with tetrafluorethylene-propylene terpolymer;
d. a wire mesh ring adjacent the last v-ring on each side of the center element;
e. the center element comprising an o-ring having asbestos yarn impregnated with an elastomer and wrapped with tetrafluorethylene-propylene terpolymer; and
f. the wire mesh rings comprising alternating layers of wire mesh and flexible graphite.

5. A seal assembly as defined in claim 1 further comprising minimum clearance metal rings abutting each wire mesh ring.

6. A. seal assembly as defined in claim 4 wherein each wire mesh ring initially has a substantially rectangular cross section.

7. A seal assembly for use on downhole well tools which require a sliding fluid barrier comprising:
a. a center element;
b. v-rings having asbestos yarn impregnated with an elastomer disposed on opposite sides of the center element;
c. wire mesh rings adjacent to the v-rings;
d. the center element comprising an o-ring having asbestos yarn impregnated with an elastomer;
e. the wire mesh rings comprising alternating layers of wire mesh and flexible graphite; and
f. the asbestos yarn having wrapping selected from the group consisting of tetrafluorethylene-propylene copolymer and tetrafluorethylene-propylene terpolymer.

8. A seal assembly as defined in claim 7 wherein each wire mesh ring initially has a substantially rectangular cross section.

* * * * *